United States Patent
Mazurek

(10) Patent No.: US 11,824,459 B2
(45) Date of Patent: Nov. 21, 2023

(54) RESONANT CONVERTER WITH SYNCHRONOUS AVERAGE HARMONIC CURRENT CONTROL

(71) Applicant: Lee Fredrik Mazurek, Groton, CT (US)

(72) Inventor: Lee Fredrik Mazurek, Groton, CT (US)

(73) Assignee: Lee Fredrik Mazurek, Groton, CT (US)

(*) Notice: Subject to any disclaimer, the term of this patent is extended or adjusted under 35 U.S.C. 154(b) by 97 days.

(21) Appl. No.: 17/727,757

(22) Filed: Apr. 24, 2022

(65) Prior Publication Data

US 2022/0393604 A1 Dec. 8, 2022

Related U.S. Application Data

(60) Provisional application No. 63/197,556, filed on Jun. 7, 2021.

(51) Int. Cl.
| | | |
|---|---|---|
| H02M 3/335 | (2006.01) | |
| H02M 3/00 | (2006.01) | |
| H02M 1/00 | (2006.01) | |
| H02M 1/12 | (2006.01) | |

(52) U.S. Cl.
CPC ..... *H02M 3/33584* (2013.01); *H02M 1/0009* (2021.05); *H02M 1/0058* (2021.05); *H02M 1/126* (2013.01); *H02M 3/01* (2021.05)

(58) Field of Classification Search
CPC ........ H02M 3/01; H02M 3/015; H02M 3/335; H02M 3/33507; H02M 3/33569; H02M 3/33571; H02M 3/33573; H02M 3/33576; H02M 3/33584; H02M 1/0003; H02M 1/0009; H02M 1/0016; H02M 1/0054; H02M 1/0058; H02M 1/4241; H02M 7/4811; H02M 7/4815; H02M 7/41818; H02M 7/4826

See application file for complete search history.

(56) References Cited

U.S. PATENT DOCUMENTS

| | | | | |
|---|---|---|---|---|
| 2015/0349649 A1* | 12/2015 | Zane | ................... | H02M 3/1584 363/21.03 |
| 2015/0365005 A1* | 12/2015 | Panov | ............... | H02M 3/33584 307/24 |
| 2016/0181925 A1* | 6/2016 | Chiang | ............. | H02M 3/33584 363/17 |
| 2019/0052178 A1* | 2/2019 | Ishikura | ............ | H02M 3/33592 |
| 2019/0097544 A1* | 3/2019 | Albertini | ........... | H02M 3/33592 |
| 2021/0305903 A1* | 9/2021 | Furukawa | ........... | H02M 1/0006 |
| 2023/0095989 A1* | 3/2023 | Hashimoto | ....... | H02M 3/33573 363/17 |

* cited by examiner

*Primary Examiner* — Thienvu V Tran
*Assistant Examiner* — Shahzeb K Ahmad

(57) ABSTRACT

A synchronous average harmonic current controller for a bidirectional resonant power converter provides efficient load invariant voltage gain. The controller includes a switched capacitor filter which averages and compensates a current signal over each half of the synchronous switching period. The control signal encodes an independent modulated phase and non-modulated differential duty cycle error response. The error response signals provide negative feedback to a pulse width modulation stage which results in reduction of the synchronous average harmonic current. At this operating point, the harmonic voltage gain is related closely to the commanded bridge duty cycles.

20 Claims, 13 Drawing Sheets

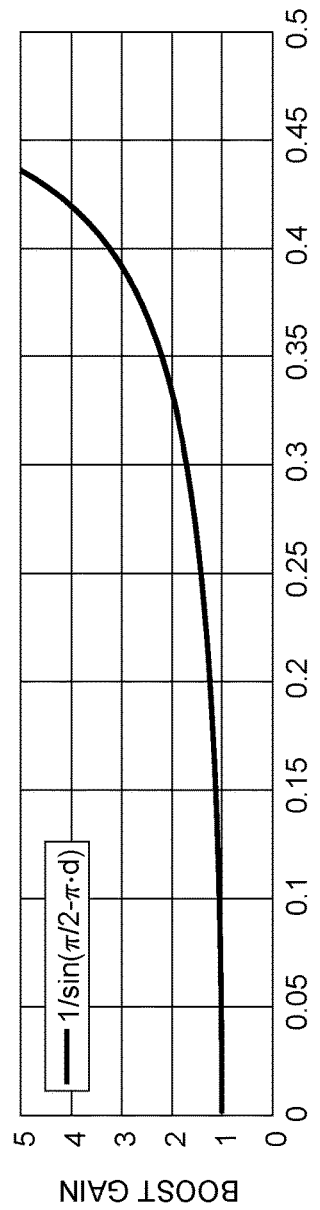
FIG. 9A
FIG. 9B
FIG. 9C

RESONANT CONVERTER WITH SYNCHRONOUS AVERAGE HARMONIC CURRENT CONTROL

CROSS-REFERENCE TO RELATED APPLICATIONS

This application claims the benefit of U.S. provisional application 63/197,556 filed Jun. 7, 2021, which is incorporated by reference herein in its entirety

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM

Not applicable

STATEMENT REGARDING PRIOR DISCLOSURES BY THE INVENTOR OR A JOINT INVENTOR

Not applicable

BACKGROUND OF THE INVENTION

The present disclosure generally relates to a bidirectional electronic power conversion system and, more specifically, to a resonant power converter with synchronous average harmonic current control and methods of controlling the same.

Resonant power converters are used to efficiently convert DC input power to isolated DC output power with favorable magnetic integration. In prior art (FIG. 1) voltage regulation is achieved by varying the primary bridge (101) excitation frequency with a voltage controlled oscillator. The phase of the rectified secondary bridge (102) current relative to the voltage of the primary bridge results in highly efficient soft switching behavior. Efficiency is further improved in prior art by using an ideal diode controller, such as a current zero crossing detector, to control an active bridge rectifier. Resonant power converters can be implemented using relatively small transformers whose inherent inductance forms part of the resonant filter (105).

The voltage gain for prior art resonant power converters is highly load dependent. FIG. 2 shows the voltage gain calculated using a first harmonic equivalent resistive load for the prior art resonant power converter shown in FIG. 1. The results are normalized relative to the resonant frequency for resistive loads ranging from underdamped to overdamped relative to the resonant filter impedance. The underdamped, or lightly loaded, case (201) achieves a large boost voltage gain below the natural frequency, but is unable to buck or significantly attenuate the voltage above the natural frequency. The critically damped, moderately loaded, case (202) can only achieve moderate buck regulation and the overdamped, highly loaded, case (203) has significant buck regulation. The behavior for the prior art resonant power converter is undefined for power generating loads. Other prior art methods for regulating the output of resonant power converters include varying the duty cycle and phase which can also result in load and impedance dependent behavior when applied independently. It is desirable to improve resonant power converters to allow for repeatable behavior over a wide range of regulation and load levels with reduced conduction loss.

BRIEF SUMMARY OF THE INVENTION

In one aspect, the objective of this invention is to implement an efficient bi-directional load invariant resonant power converter with voltage gain dependent solely on commanded duty cycles. This objective is accomplished in the present invention by using a synchronous average harmonic current controller to minimize the synchronous average harmonic bridge current with negative feedback. In the preferred embodiment (FIG. 3), the synchronous average harmonic current controller is comprised of the non-resonant bridge current sensor (307), switched capacitor filter (308), and pulse width modulation stage (309). The switched capacitor filter synchronously averages and compensates the bridge current signal over each half of the fundamental harmonic switching period. Two independent control signals are encoded by the switched capacitor filter in the modulated and non-modulated time reference frame by the switched capacitor difference and common signals. The pulse width modulation stage is sensitive to each of the independent control signal inputs. The difference signal is applied in the modulated reference frame to control the relative phase between the resonant and non-resonant bridges. The common signal is applied in the non-modulated reference frame to control the differential duty cycle of the non-resonant bridge. Negative feedback minimizes the total common and difference signal of synchronous average current. Reducing the synchronous average current results in the converter approaching the ideal current required for harmonic power transmission. As a consequence of the synchronous average harmonic current being minimized, the converter achieves an equilibrium controlled by the harmonic voltage of each bridge. This results in the voltage gain being well defined by the duty cycle command references to the resonant and non-resonant bridges.

These and additional objects and advantages provided by the embodiments described herein will be more fully understood in view of the following detailed description, in conjunction with the drawings.

BRIEF DESCRIPTION OF THE SEVERAL VIEWS OF THE DRAWING(S)

Figure 5:
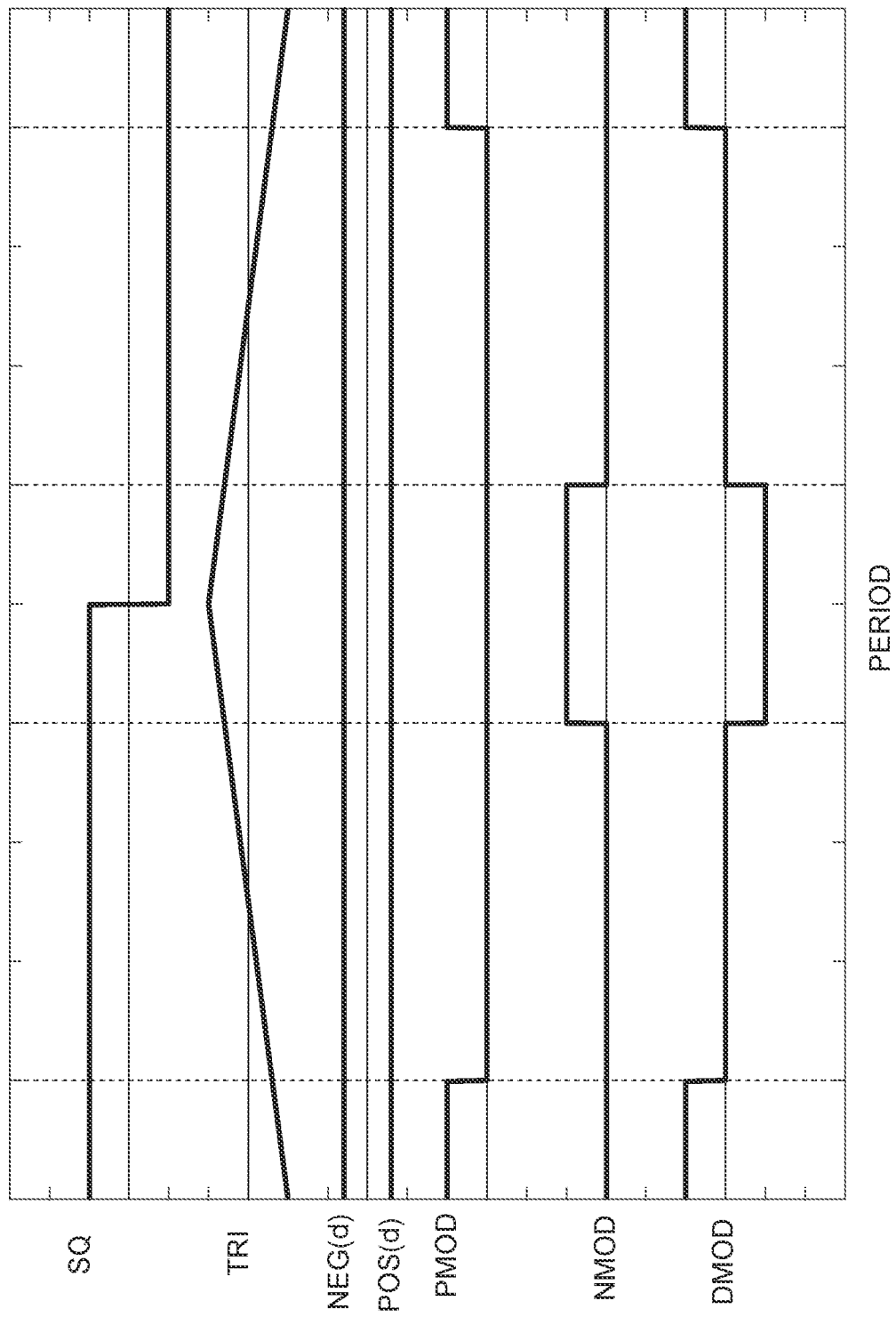

FIG. 5 shows a square wave (SQ) which is used for synchronizing the converter and its integral which is the triangle wave (TRI) used for pulse width modulation, and the differential duty cycle signal given by NEG(d) and POS(d), which are compared to the triangle wave to result in PMOD and NMOD, and the differential modulation waveform DMOD according to one or more embodiments shown and described herein.

Figure 6B:
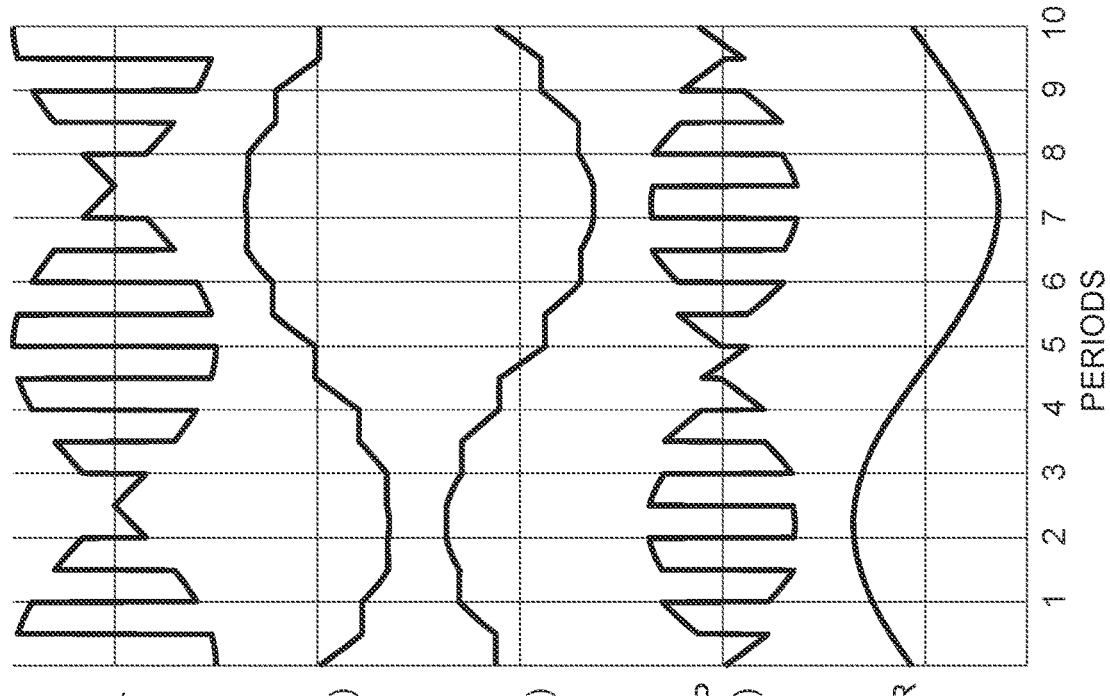
Figure 6A:
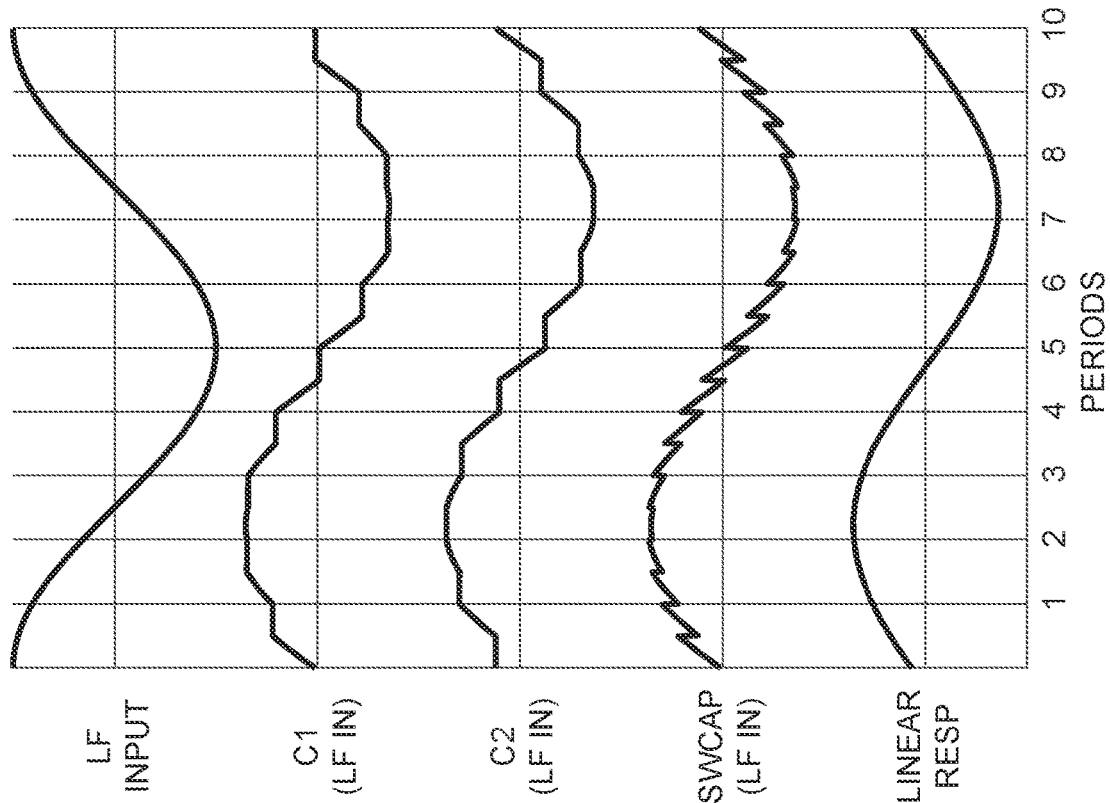

FIG. 6A shows the switched capacitor filter response to low frequency inputs from the current-sense amplifier, where the input (LF INPUT) is dynamically averaged and compensated by two independent capacitors (CAP1 and CAP2) which are switched into the circuit every half period synchronously with a square wave, and the response of the two capacitors is alternately sampled (SWCAP) according to one or more embodiments shown and described herein.

FIG. 6B shows the switched (SWCAP) capacitor (CAP1 and CAP2) response due to high frequency input (HF input) according to one or more embodiments shown and described herein.

Figure 7A:
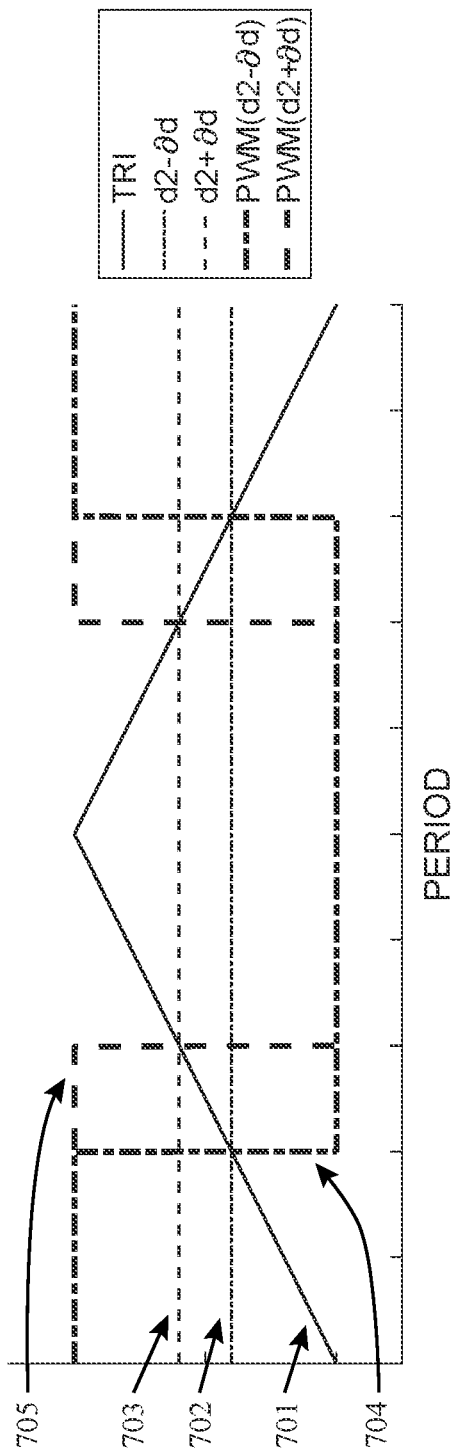

FIG. 7A shows a process to take an existing signal input and modify differential duty cycle without affecting phase, where a positive and negative differential duty cycle is added to a given input duty cycle to get signals d−∂d (702) and d+∂d (703) which are compared to the triangle wave (701) and result in their respective PWM signals (704 and 705) according to one or more embodiments shown and described herein.

Figure 7B:
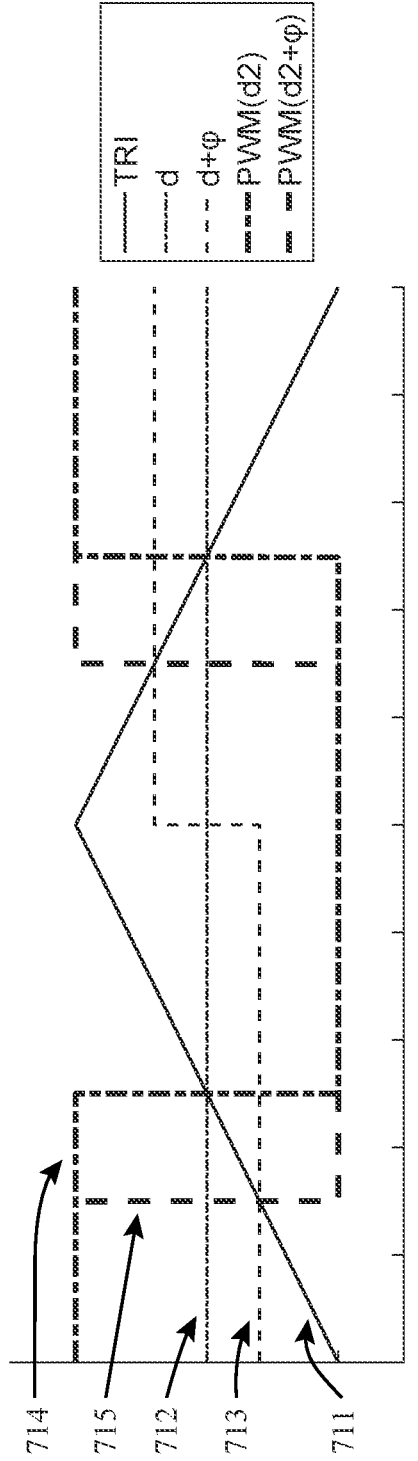

FIG. 7B shows a process to take an existing signal input and modify phase without affecting duty cycle, where a square wave is added to a given input duty cycle, d (712), to get the signal ∂+φ (713) which is compared to the triangle wave (711) and results in the respective PWM response (714 and 715) according to one or more embodiments shown and described herein.

Figure 8A:
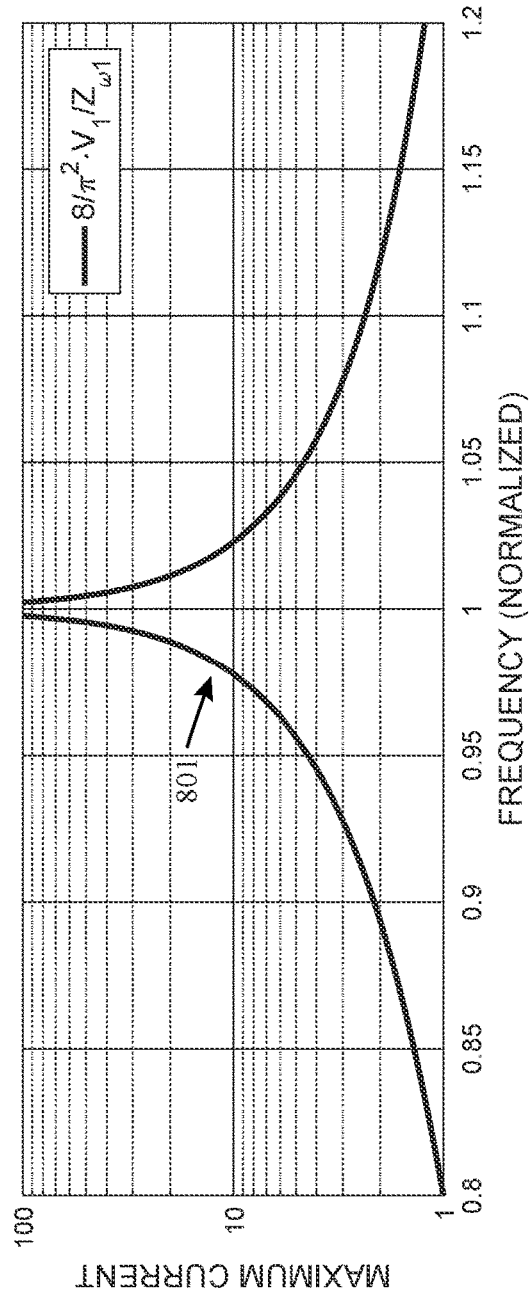

FIG. 8A Shows an example of maximum current transfer (801) versus normalized carrier frequency according to one or more embodiments shown and described herein.

Figure 8B:
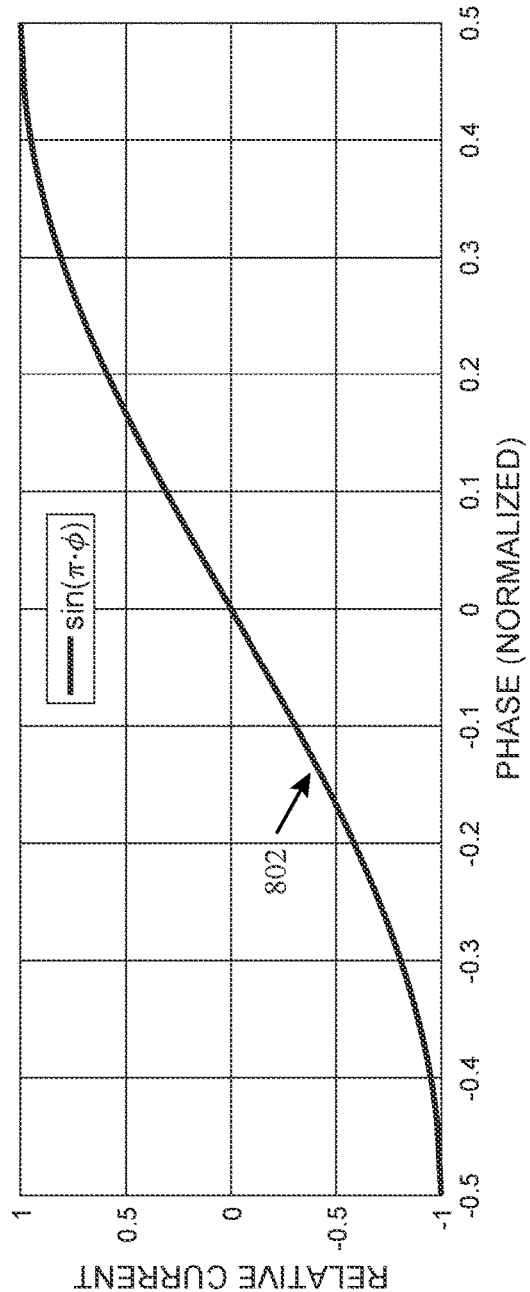

FIG. 8B Shows relative output current (802) versus normalized phase shift between bridges according to one or more embodiments shown and described herein.

FIG. 9A shows buck gain of the resonant power converter using a 1:1 transformer by varying the input duty cycle ($d_1=d$, $d_2=1/2$) according to one or more embodiments shown and described herein.

FIG. 9B shows boost gain of the resonant power converter using a 1:1 transformer by varying the output duty cycle ($d_2=1/2-d$) according to one or more embodiments shown and described herein.

Figure 10:
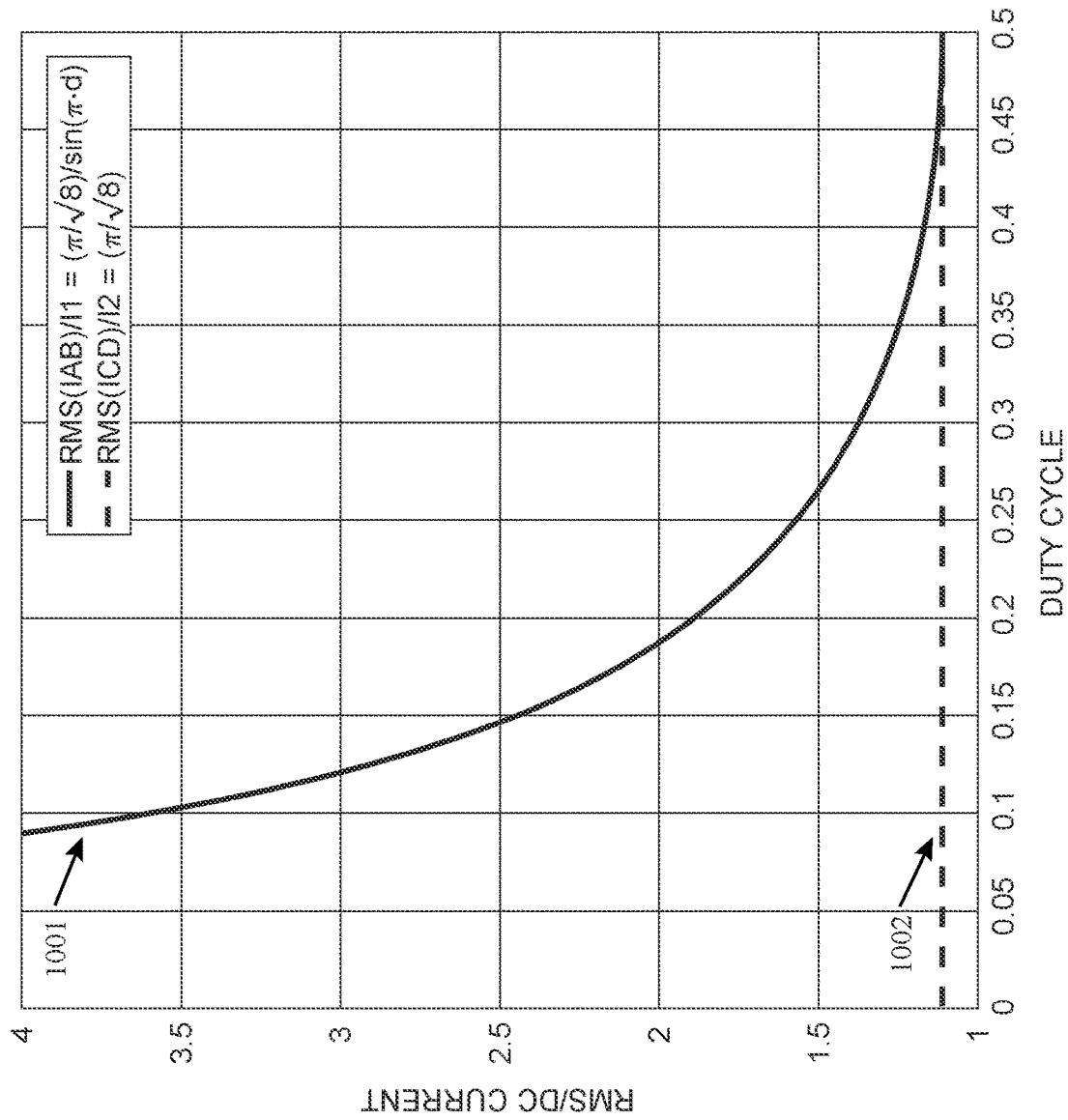

FIG. 9C shows the buck boost gain of the resonant power converter using a 1:1 transformer by varying both the input and output duty cycle ($d_1=d$, $d_2=1/2-d$) according to one or more embodiments shown and described herein FIG. 10 shows the ratio of root mean square (RMS) transformer current to DC bus current for the input (1001) and output (1002) side of the resonant power converter operating with buck gain according to one or more embodiments shown and described herein.

Figure 11A:
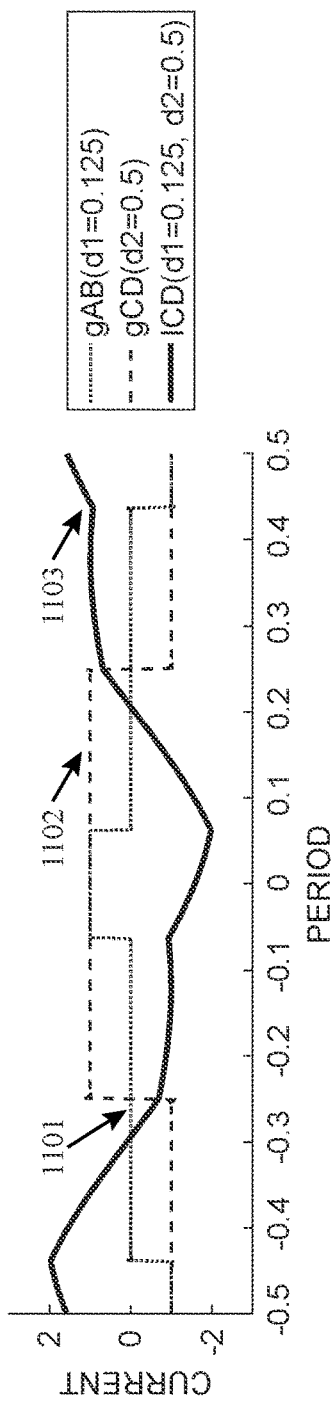

FIG. 11A show the current in the non-resonant transformer coil (1103) for a 12.5% input duty cycle along with gate waveforms (1101 and 1102) according to one or more embodiments shown and described herein.

Figure 11B:
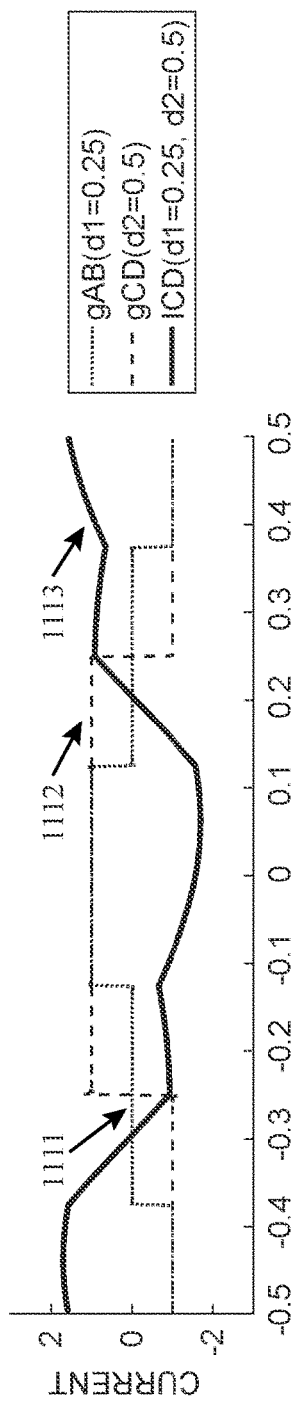

FIG. 11B shows the current in the non-resonant transformer coil (1113) for a 25% input duty cycle along with gate waveforms (1111 and 1112) according to one or more embodiments shown and described herein.

Figure 11C:
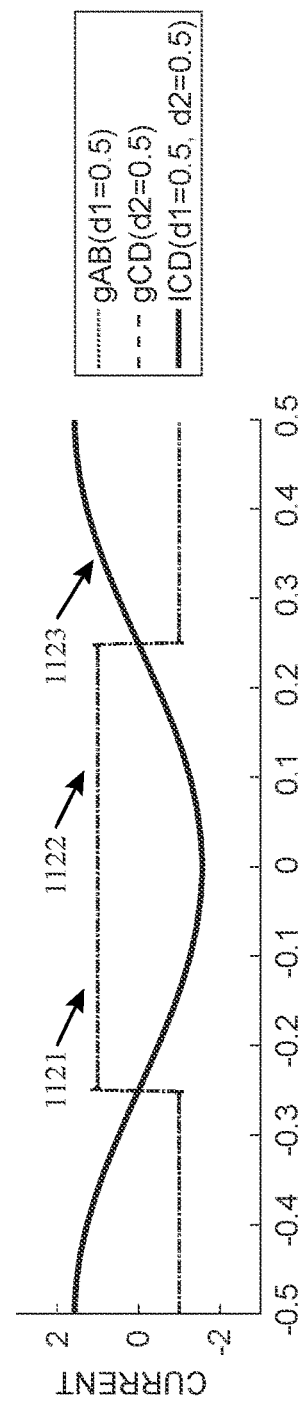

FIG. 11C shows the current in the non-resonant transformer coil (1123) for a 50% input duty cycle along with gate waveforms (1121 and 1122) according to one or more embodiments shown and described herein.

Figures 12A, 12B:
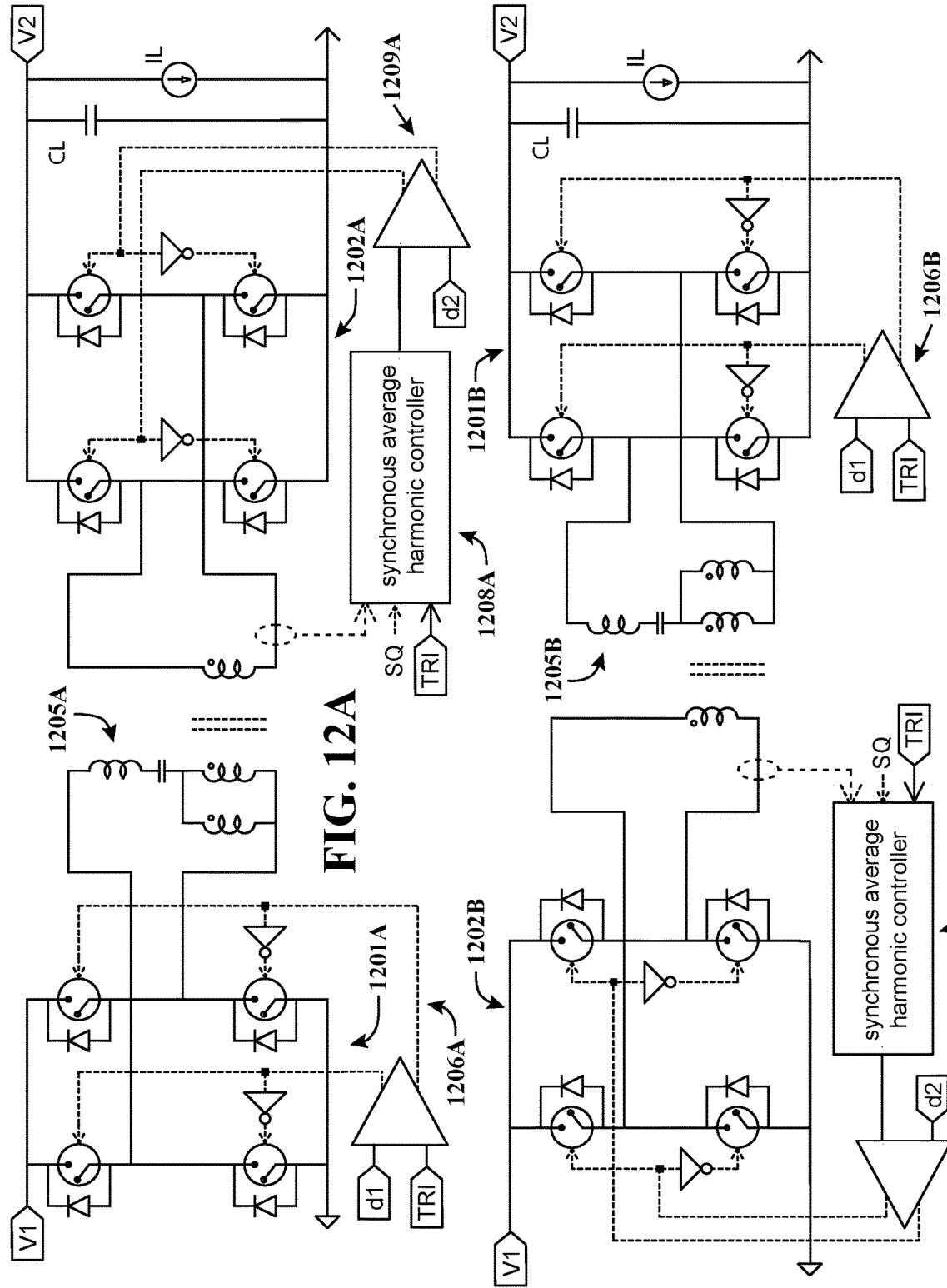

FIG. 12A shows an embodiment of the resonant power converter with an input on its resonant side and load on its non-resonant side according to one or more embodiments shown and described herein.

FIG. 12B shows an embodiment of the resonant power converter with an input on its non-resonant side and load on its resonant side according to one or more embodiments shown and described herein.

Figure 13:
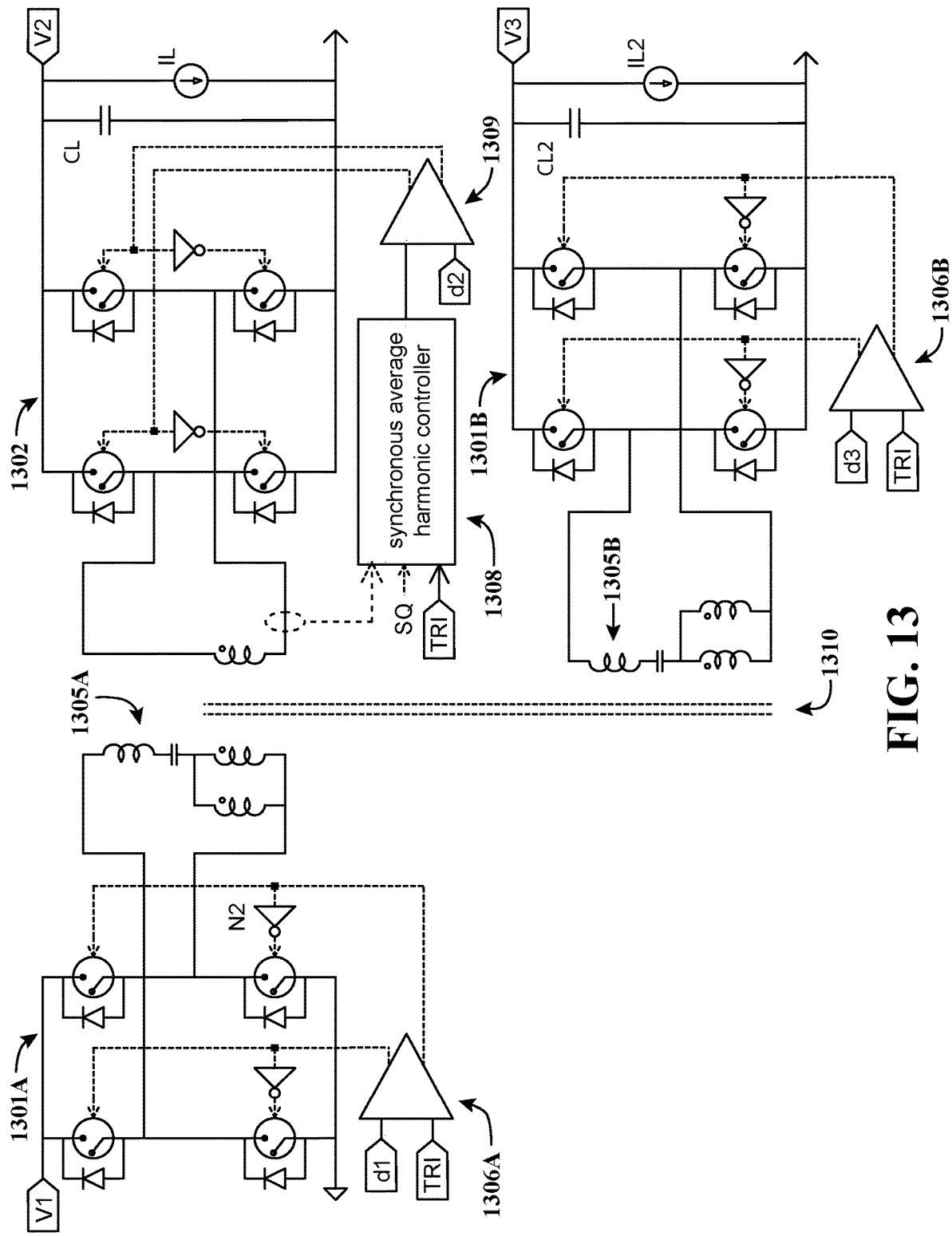

FIG. 13 shows an embodiment of the resonant power converter with a resonant input, a non-resonant output, and an auxiliary resonant output according to one or more embodiments shown and described herein.

DETAILED DESCRIPTION OF THE INVENTION

Embodiments described herein generally relate to a resonant power converter and methods of forming a resonant power converter with synchronous average harmonic current control. As shown and described herein, new embodiments of resonant power converters with synchronous average harmonic current control are provided. The presently invented converter controls the synchronous harmonic current between two isolated bridges to allow for buck-boost voltage regulation with good power and parts count efficiency.

Figure 1:
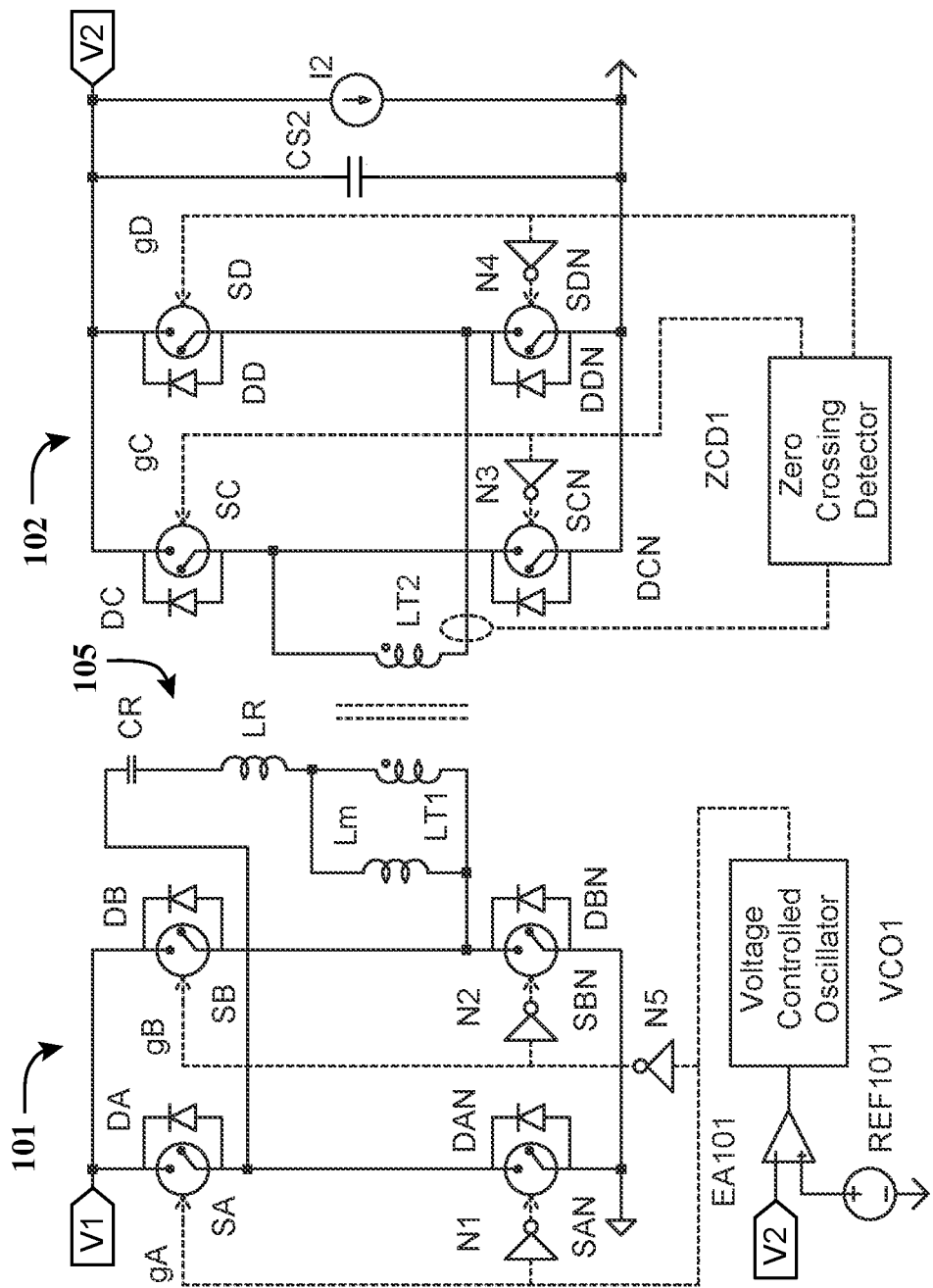
FIG. 1 illustrates a prior art resonant power converter which uses variable frequency to achieve voltage regulation.
Figure 2:
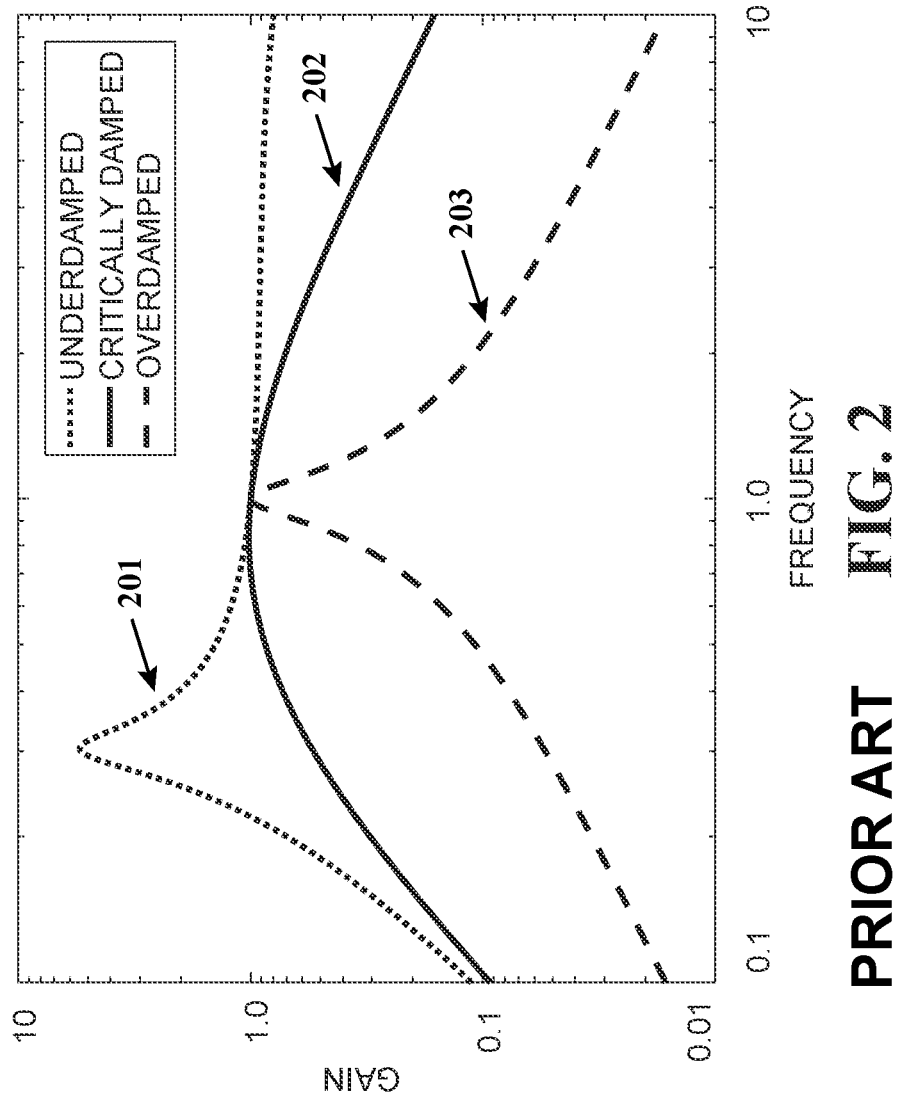
FIG. 2 illustrates load dependency of the prior art resonant power shown in FIG. 1
Figure 3:
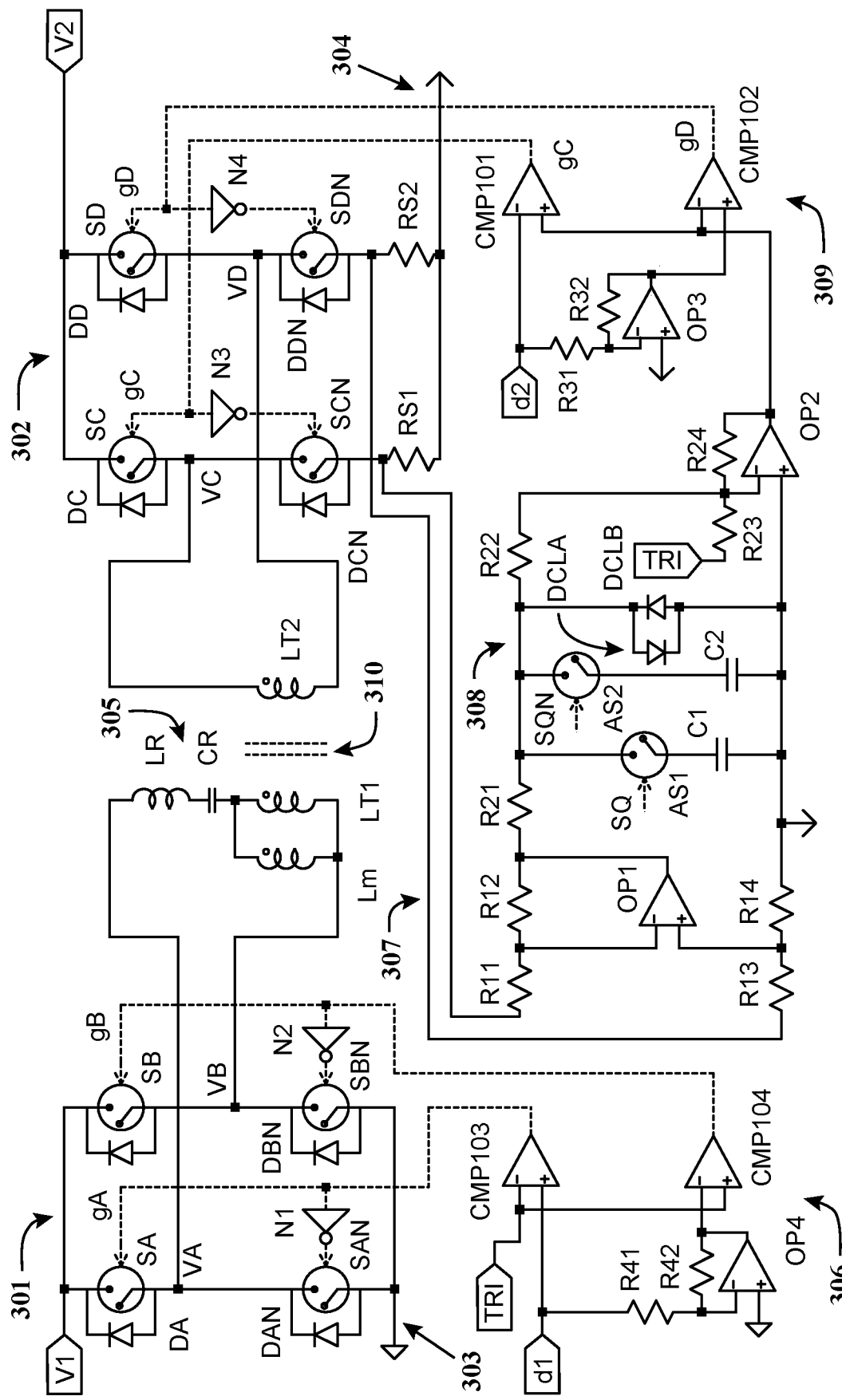
FIG. 3 is a schematic showing an embodiment of the resonant power converter with synchronous average harmonic current control according to one or more embodiments shown and described herein.

Turning now to the drawings wherein like numbers refer to like structures, the first embodiment of the presently invented power converter is shown in FIG. 3. The power converter is bi-directional and therefore the terms 'primary' and 'secondary' are not used. Instead, the converter has a resonant bridge (301) referenced to a first reference (303) and a non-resonant bridge (302) referenced to a second reference (304). The resonant bridge applies a voltage across a resonant network (305) in series with an isolation transformer (310) which is connected directly to the non-resonant bridge. An arbitrary duty cycle controls the buck gain using the resonant bridge PWM controller (306). The non-resonant bridge is harmonically synchronized to the resonant bridge by feeding the non-resonant bridge current sensor (307) to the synchronous average harmonic controller (308). An arbitrary duty cycle controls the boost gain using the non-resonant bridge PWM controller with synchronous feedback from the synchronous average harmonic controller. The synchronous average harmonic controller results in the converter having low conduction losses and a load invariant gain controlled by its boost and buck duty cycle commands.

The power transfer in FIG. 3 is accomplished by the resonant bridge (301), resonant network (305), isolation transformer (310), and non-resonant bridge (302). The resonant bridge (301) is an H-bridge composed of four switches (SA. SAN, SB, SBN) and their respective diodes (DA. DAN, DB, DBN) with complementary (N1, N2) gate inputs. The switches SA and SAN (and SB and SBN) are driven with complementary signals using N1 (and N2) with sufficient dead-time to prevent shoot-through current. The differential voltage between VA and VB of the resonant bridge is applied to the resonant network (305) and transformer (310). The resonant network is composed of a series capacitor (CR) and/or inductor (LR) and may optionally have a parallel magnetizing inductance (Lm). The resonant network acts as a harmonic filter for the voltage isolated by the transformer (310) which is composed of coupled inductors LT1 and LT2. The first embodiment uses a 1:1 turns ratio for descriptive simplicity, but may be generalized to other turns ratios by proportionally scaling voltage and current inversely with power preserved. The transformer is directly connected to the non-resonant bridge (302) at VC and VD. The non-resonant bridge is an H-bridge composed of four switches (SC, SCN, SD, SDN) and their diodes (DC, DCN, DD, DDN) with complementary (N3, N4) gate inputs. The switches SC and SCN (and SD and SDN) are driven with complementary signals using N3 (and N4) with sufficient dead time to prevent shoot through current. Each switch (SA, SAN, SB, SBN, SC, SCN, SD, SDN) has either an external or apparent built-in diode to prevent excessive reverse voltage. The switches are implemented according to the state of the art, with MOSFETs or GANFETS being used in the preferred embodiment.

The power converter duty cycle inputs, d1 and d2, are modulated by the resonant bridge PWM controller (306), and the non-resonant bridge PWM controller (309) shown in FIG. 3. The resonant bridge PWM controller (306) has a triangle waveform (TRI) and duty cycle (d1) as inputs. The controller (306) inverts the duty cycle using R41, R42 and OP4 and compares both the noninverted and inverted duty cycle signals to the triangle waveform using comparators CMP103 and CMP104 to drive the resonant bridge signals gA and gB respectively. The non-resonant bridge PWM controller (309) uses a triangle wave with superimposed synchronous average harmonic feedback control signal and duty cycle (d2) as inputs. This controller (309) inverts the duty cycle using R31, R32 and OP3 and compares both the noninverted and inverted duty cycle signals to the triangle waveform with superimposed feedback using comparators CMP101 and CMP102 to drive the non-resonant bridge signals gC and gD respectively. The components of blocks 306, 307, 308, and 309 may be implemented as discrete elements on a printed circuit board or packaged together in an integrated circuit.

The synchronous average harmonic controller (308) uses input from the non-resonant bridge current sensor (307) to minimize the synchronous average harmonic current. The non-resonant bridge current sensor (307) senses the shunt resistors RS1 and RS2 and amplifies their signals using the difference amplifier OP1 with gain setting resistors R11, R12, R13, R14. The current sensor senses and buffers the current through the transformer coil LT2 inferred through the low side switches SCN and SDN. The preferred embodiment of the current sensor has high bandwidth relative to the fundamental switching frequency, good common mode rejection, and is DC coupled. Other current sensing methods, such as hall sensors or isolation amplifiers, may be used by those experienced in the art for transformer coil current sensing if they have sufficient bandwidth for the intended application. The current sensor drives the synchronous average harmonic controller (308) which is composed of a switched capacitor filter (R21, C1, C2, DCLA, DCLB and AS1, AS2) which injects a feedback signal through an inverting summing amplifier (0P2, R22, R23 and R24). The preferred switch embodiment for AS1 and AS2 uses a CMOS of JFET analog switch with low timing error, controlled on and off impedance, and low charge injection. The switches (AS1 and AS2) are driven with a square wave (SQ) and its logical complement (SQN) which is synchronous with the modulation triangle wave (TRI). The capacitors C1 and C2 alternately average and compensate the current over each half of the switching frequency time period. The sampled signal from the capacitors is used to adjust the non-resonant bridge's phase and its differential duty cycle. The difference between each capacitor's response results in a phase error signal, and the common capacitor response results in a differential duty cycle error signal. Assuming that C1 and C2 have the same value and R21 and R22 have the same value, the feedback compensator's dynamics are approximated by the linear dynamic model given by R21 and C1. A series R-C network may be placed in parallel with both C1 and C2 to adjust the compensator dynamics. The output of the synchronous average harmonic controller is the modulation triangle waveform with superimposed feedback which is used by the non-resonant bridge PWM controller to minimize the synchronous average harmonic current.

Figure 4:
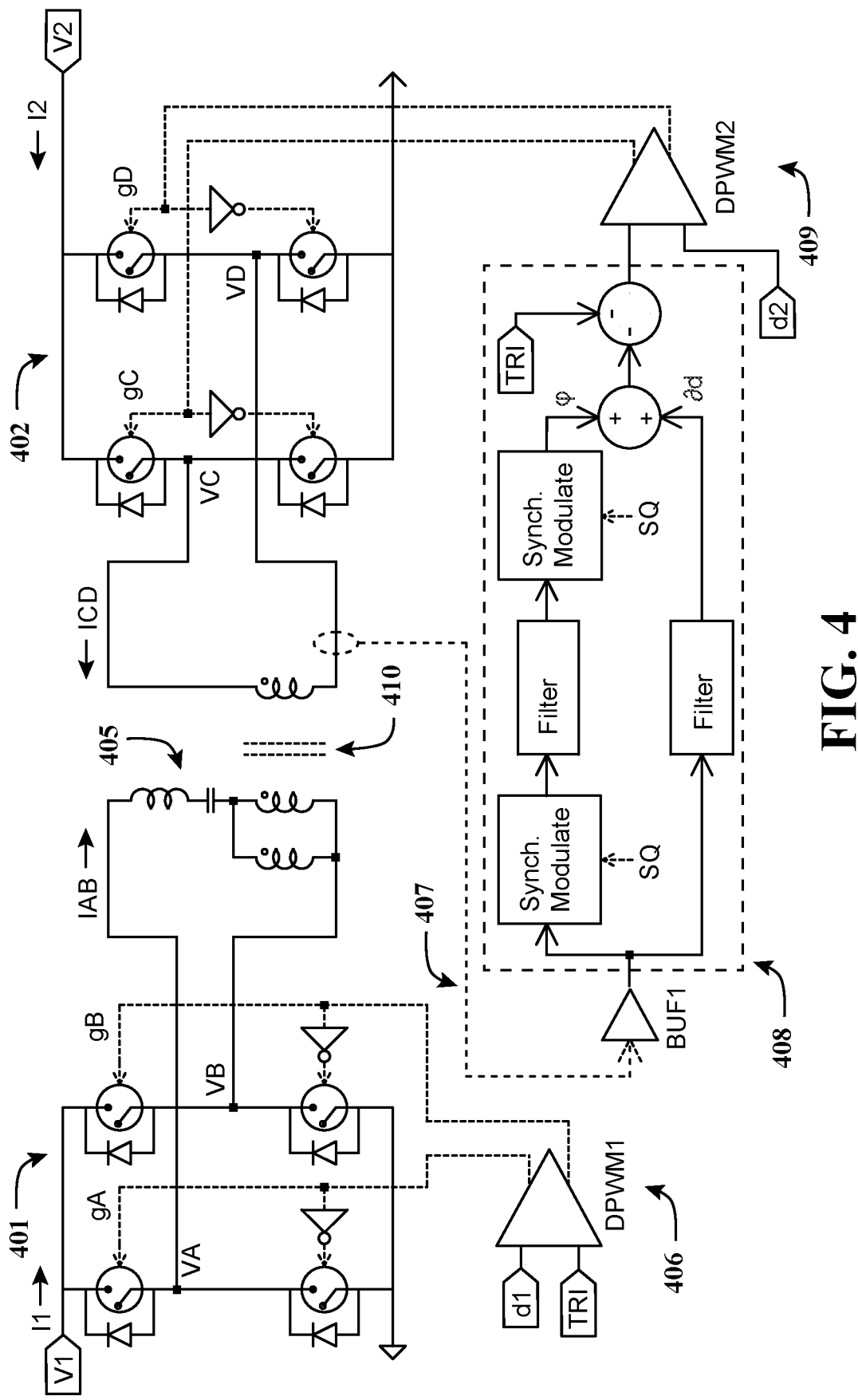
FIG. 4 shows the equivalent functional block diagram representing the synchronous average harmonic current controller shown in FIG. 3 according to one or more embodiments shown and described herein.

The detailed schematic shown in FIG. 3 is illustrated in FIG. 4 with functionality replaced by equivalent block diagrams. The resonant and non-resonant bridges shown in FIG. 4, labelled 401 and 402, contain the same components as 301 and 302 respectively. The resonant network (405) and isolation transformer (410) shown in FIG. 4 contain the same components as FIGS. 3 (305 and 310) respectively. The resonant bridge PWM controller shown in FIG. 3 (306) is simplified in FIG. 4 as 406 to only show its input duty cycle and triangle waveform (d1, TRI) and output gate signals (gA, gB). The non-resonant bridge current sensor shown in FIG. 3 (306) is simplified in FIG. 4 (406) to approximate the current (ICD) directly and output a proportional buffered signal using BUF1. The sign convention for current, ICD (or IAB), is positive for flow from VC to VD (or VA to VB). The synchronous harmonic controller shown in detail in FIG. 3 (306) is represented by the blocks shown in the dashed control volume (408). The present embodiment uses phase feedback and differential duty cycle feedback to transfer power while minimizing synchronous average harmonic current. The harmonic current is broken into low frequency, or $0^{th}$ harmonic, and ripple terms (or weighted Pt and higher harmonics). The controller calculates a differential duty cycle signal, δd, and a phase offset signal, φ, to reduce the synchronous average harmonic current and superimposes these control signals onto the modulation triangle waveform (TRI). The current is synchronously modulated using the square wave (SQ), dynamically compensated using a filter, and then remodulated to result in the phase offset signal, φ. The current is also dynamically compensated using a filter to result in the differential duty cycle signal, dd. The phase offset signal, φ, differential duty cycle signal, δd, and triangle waveform (TRI) are summed together and output from the synchronous harmonic controller. The non-resonant bridge PWM controller shown in FIG. 3 (309) is simplified in FIG. 4 as 409 to show its input duty cycle (d2) and the input modulation signal from the synchronous harmonic controller and output gate signals (gC, gD). The mechanism for the pulse width modulation and synchronous average harmonic controller is described further in FIG. 5, FIG. 6, and FIG. 7.

FIG. 5 illustrates the duty cycle modulation signals used by the bridge PWM controllers (306 and 309) shown in FIG. 3. The signals are illustrated with a common time axis which is normalized to one switching period. The first signal shown is the square waveform (SQ) which is high for the first half of the switching period and low for the second half of the switching period. The square wave is used by the synchronous average harmonic controller to synchronize its switched capacitor filter. The triangle waveform (TRI) is the integral of the square waveform and both the square and triangle waveforms are synchronous with the switching period. The triangle waveform is used by the resonant bridge PWM controller (306) to perform PWM duty cycle modulation, and the non-resonant bridge PWM controller to perform PWM duty cycle and phase modulation. The illustrated positive (POS(d)) and negative (NEG(d)) duty cycle signals are shown where the negative duty cycle is calculated by reflecting the positive duty cycle about its center value (d=0.5). The positive modulation pattern (PMOD) is created by comparing the positive duty cycle (POS(d)) to the triangle waveform (TRI). The negative modulation pattern (PMOD) is created by comparing the triangle waveform (TRI) to the negative duty cycle (NEG(d)). The difference modulation pattern (DMOD) is the difference between the positive and negative modulation patterns (PMOD and DMOD respectively). Other equivalent methods are available to those experienced in the art to perform pulse width modulation, such as taking the difference between square waves with opposing phase shifts or by comparing a duty cycle reference to two antiphase triangle waves. The difference modulation pattern (DMOD) represents the difference between the logical gate signals (gA and gB) applied to the resonant bridge switches.

Harmonic analysis is used to describe the power transfer and resulting voltages for the presently invented power converter. The resonant bridge voltage is $V_1 \cdot g_{AB}(\theta)$, where $V_1$ is the rail voltage, $g_{AB}(\theta)$ is the difference in logical gate signals for the resonant bridge, and $\theta$ is the normalized angle (or normalized time) within the switching period ranging from −0.5 to 0.5. The first harmonic response for the differential gate signal, $\vec{g}_{AB,k=1}$, over one period is:

$$\vec{g}_{A,k} = \frac{\sin(d_1 k\pi)}{k\pi} \cdot e^{(-2\pi i k \varphi_1)} \quad \text{EQ 1A}$$

$$\vec{g}_{B,k} = \frac{\sin(d_1 k\pi)}{k\pi} \cdot e^{\left(-2\pi i k\left(\varphi_1 + \frac{1}{2}\right)\right)} \quad \text{EQ 1B}$$

$$\vec{g}_{AB,k=1} = \vec{g}_{A,k=1} - \vec{g}_{B,k=1} = 2 \cdot \frac{\sin(d_1 k\pi)}{\pi} \cdot e^{(-2\pi i \varphi_1)} \quad \text{EQ 1C}$$

where $\vec{g}_{A,k}$ and $\vec{g}_{B,k}$ represents the $k^{th}$ harmonic of the Fourier series for the first and second set of switches of the resonant side bridge (301) respectively, and $\vec{g}_{AB,k}$ is the difference between $\vec{g}_{A,k}$ and $\vec{g}_{B,k}$. The harmonic, $k=\omega/\omega_c$, is the analysis frequency normalized by the switching frequency ($\omega_1=\omega_c$, is the carrier or switching frequency). The amplitude, $\sin(d_1 k\pi)/k\pi$, results from integrating a signal with duty cycle, $d_1$, over the $k^{th}$ harmonic basis function. The complex phase, $e^{(-2\pi i k \varphi_1)}$, results from the normalized phase, $\varphi_1$, which is between −0.5 and 0.5 (or −180 to 180 degrees). The gate signals, $\vec{g}_{A,k}$ and $\vec{g}_{B,k}$, are 180 degrees out of phase (consistent with the modulation process shown in FIG. 5). This results in the difference between their first harmonics, $\vec{g}_{AB,k=1}$, having twice the magnitude of the individual gate signals. Other modulation patterns may be appropriate for reduced complexity embodiments, including but not limited to using complementary switch inputs ($g_B = \overline{g_A}$ and $d_B = 1 - d_A$) or replacing one half of the bridge with capacitors ($\vec{g}_{B,0} = \vec{g}_{A,0}$ and $\vec{g}_{B,k} = 0$ for $|k| > 0$).

The non-resonant bridge uses similar modulation processes to the resonant side bridge, but with the phase and differential duty cycle altered to transfer power while minimizing synchronous average harmonic current. The phase and differential duty cycle control paths are compensated in the present embodiment by a switched capacitor filter which filters the non-resonant bridge current. The switched capacitor circuit has two switches which are driven by a square wave to select one of two dynamic averaging capacitors synchronously over each half of the switching period. The switched capacitors are sampled each half cycle to drive the input to the phase and duty cycle servo. The filter has a low frequency and ripple current pathway shown electrically in FIG. 3 and using a block diagram in FIG. 4. These pathways share the same components, but are selectively responsive to different input frequencies. The duty cycle differential servo feeds back on low frequency current to control the differential voltage on each half (VC and VD) of the non-resonant H-bridge. The phase servo feeds back on the high frequency ripple current (which is proportional to the harmonic voltage between the bridges as shown in EQ6) to control the current transferred to the non-resonant H-bridge. The response for the filter to feedback on each of these pathways is illustrated in FIG. 6.

FIG. 6A shows the switched capacitor filter response used in the synchronous average harmonic controller for a representative low frequency input from the current sensor (307). The common time axis for the figure is illustrated for ten normalized switching periods. The first waveform shown is LF IN which represents a low frequency signal. C1 (LF IN) and C2 (LF IN) show the first and second capacitor response respectively due to low frequency signal. These capacitors are charged due to the voltage difference across R21 when each is respectively switched into the circuit by AS1 and AS2. At low frequencies the two capacitor responses are similar because the low frequency input has a longer period than the half period where each capacitor is alternately switched into the circuit. The sampled response of the switched capacitors due to low frequency input is shown as SWCAP (LF IN). The linearized response, as calculated using a first order lowpass ($f_{LP} = 1/(2\pi R_{21}C_1)$), is shown as LINEAR RESP (LF IN). The differential duty cycle feedback path (illustrated conceptually in FIG. 7A) is selective to the switched capacitor response due to low frequency inputs, which is common over each half-period.

FIG. 6B shows the switched capacitor filter response for a representative high frequency input from the current sensor (307). The first waveform shown is HF INPUT which represents a high frequency (or ripple current) signal. C1 (HF IN) and C2 (HF IN) show the first and second capacitor response respectively due to high frequency input. At high frequencies, the two capacitor responses are different because the input varies over each half period when each capacitor is alternately switched into the circuit. The sampled response of the switched capacitors due to high frequency input is shown as SWCAP (HF IN). The linearized response, shown as LINEAR RESP (HF IN), models the overall amplitude response of the filter, but differs because it is not modulated. The phase feedback path (FIG. 7B) is selective to the switched capacitor response due to high frequency (ripple) inputs, which is different over each half-period.

FIG. 7A illustrates the mechanism of the differential duty cycle feedback path. The common time axis of the figure is shown for one switching period. The triangle (701, TRI) waveform is used for modulation of the input duty cycle. Differential duty cycle feedback keeps the average duty cycle constant, while lowering the duty cycle of one half (VC) of the non-resonant bridge (302), and increasing the duty cycle of the other half of the bridge (VD). This is shown in the FIG. 7A as lines 702 (d2+∂d) and 703 (d2−∂d). The corresponding pulse width modulation pattern resulting from comparing each duty cycle to the triangle wave is shown as lines 704 (PWM(d2−∂d)) and 705 (PWM(d2+∂d)) respectively. The differential duty cycle feedback path alters the average voltage at VC and VD so that they are approximately equal to reduce low frequency current. In practice, the modulation pattern for VD is 180 degrees delayed in time with VC to result in an AC voltage difference, but this was not illustrated as it does not affect the conceptual explanation of the differential duty cycle feedback.

FIG. 7B illustrates the mechanism of the phase feedback path. The triangle (711, TRI) wave is used for modulation of the input duty cycle with phase offset. For the phase feedback path, line 712 (d2) shows a starting duty cycle and line 713 shows it with a superimposed phase control signal (d2+φ). In this instance, the same phase signal is applied to each half of the non-resonant bridge (302) resulting in a common phase offset for VC and VD. The modulation pattern for line 715 (PWM(d2+φ)) shows the effect of adding a phase control signal relative to line 714 (PWM (d2)). The average duty cycle of the first modulation pattern (714) is preserved, but the phase control signal (713) results in advancing the pulse width modulation pattern (715). Both advance and delay are achievable using this modulation scheme which superimposes a synchronous analog square wave to result in phase offset. The synchronous average harmonic controller generates the phase control signal which results in the synchronous average harmonic current being reduced.

The presently invented converter transfers power across the isolation transformer by altering the phase offset, φ=φ$_2$−φ$_1$, between the resonant and non-resonant bridges such that net current flows. For the purpose of analysis, the resonant side current and voltage are subscripted by 1 to indicate input, and the non-resonant side current and voltage are subscripted by 2 to indicate output.

However, the input and output may be interchanged because the converter is bi-directional. The transferred current is controlled by the sine of the phase angle between the bridges and is scaled by maximum current which is limited by the harmonic voltage and impedance.

The resonant bridge transfer current, mean($I_1$), is given in terms of the current, $I_{AB}$, and the gate signal, $g_{AB,\omega}$, in EQ2:

$$\text{mean}(I_1) = ((V_1 \cdot \vec{g}_{AB,\omega} - V_2 \cdot \vec{g}_{CD,\omega}) \odot \vec{Z}_\omega^{-1}) \cdot \vec{g}_{AB,\omega}^* \quad \text{EQ2A}$$

$$\text{mean}(I_1) = V_1 \cdot (\vec{g}_{AB,\omega} \odot \vec{Z}_\omega^{-1}) \cdot \vec{g}_{AB,\omega} - V_2 \cdot (\vec{g}_{CD,\omega} \odot \vec{Z}_\omega^{-1}) \cdot \vec{g}_{AB,\omega}^* \quad \text{EQ2B}$$

$$\text{mean}(I_1) = -V_2 (\vec{g}_{CD,\omega} \odot \vec{Z}_\omega^{-1}) \cdot \vec{g}_{AB,\omega} \quad \text{EQ2C}$$

where $\vec{Z}_\omega^{-1}$ is Fourier series of the admittance (or inverse of the resonant impedance), and '$\odot$' represents the Hadamard or element-wise multiply of each harmonic. The terms which modulate to DC (giving net current transfer) result from conjugate frequency pairs ($e^{+ik} \cdot e^{-ik} = e^0 = 1$) of the current, $I_{AB} = ((V_1 \cdot g_{AB,\omega} - V_2 \cdot \vec{g}_{CD,\omega}) \odot \vec{Z}_\omega^{-1})$ and the modulated gate signal, $\vec{C}_{AB,\omega}$. EQ2B distributes the terms from EQ2A, and EQ2C eliminates the terms which do not affect the DC current due to the reactive impedance and symmetric harmonic expansion ($V_1 \cdot (\vec{g}_{AB,\omega} \odot \vec{Z}_\omega^{-1}) \cdot \vec{g}_{AB,\omega} = 0$).

EQ3A shows the first harmonic expansion which controls the current transfer, and EQ3B simplifies the expression using a sinusoidal expansion of the gate signals:

$$\text{mean}(I_1) = -2 \cdot \text{Real}\left(V_2 \cdot Z_{\omega1}^{-1} \cdot (g_{CD,\omega1} \cdot \overline{g}_{AB,\omega1})\right) \quad \text{EQ 3A}$$

$$\text{mean}(I_1) = -\frac{8}{\pi^2} \cdot V_2 \cdot |Z_{\omega1}^{-1}| \cdot (\sin(\pi \cdot d_1) \cdot \sin(\pi \cdot d_2)) \cdot \sin(\pi \cdot \varphi) \quad \text{EQ 3B}$$

where $d_1$ and $d_2$ are the duty cycles for the resonant and non-resonant bridges respectively. The mean current transfer, mean($I_2$), to the non-resonant side is calculated in a similar fashion:

$$\text{mean}(I_2) = \frac{8}{\pi^2} \cdot V_1 \cdot |Z_{\omega1}^{-1}| \cdot (\sin(\pi \cdot d_1) \cdot \sin(\pi \cdot d_2)) \cdot \sin(\pi \cdot \varphi). \quad \text{EQ 4}$$

The maximum current output occurs for full duty cycles and phase shift ($d_1$=0.5, $d_2$=0.5, φ=0.5) as:

$$\max(\text{mean}(I_2)) = \frac{8}{\pi^2} \cdot V_1 \cdot |Z_{\omega1}^{-1}| \quad \text{EQ 5}$$

where max(mean($I_2$)) is the largest possible current transfer to V2 given the resonant impedance at the carrier frequency, $Z_{\omega1}$. FIG. 8A shows an example plotted for the maximum current as a function of frequency (801) given in EQ5. FIG. 8B shows how the normalized phase is used in EQ4 to vary current transfer as a fraction of the maximum (802) given in EQ5. The magnitude of power into each bridge, $V_1 \cdot$mean($I_1$) and $V_2 \cdot$mean($I_2$), calculated using EQ3B and EQ4 is equivalent when there is negligible energy dissipation in the resonant impedance, $\vec{Z}_\omega$, and the transformer.

The presently invented converter has a diode clamp (DCLA and DCLB in FIG. 3) for the phase control signal to limit the resulting transfer current. The clamp also allows use of the most linear part of the phase to current relationship. The analog phase signal used in FIG. 3 which can realize an advance or delay allows forward and reverse current transfer. Alternative methods for phase variation which employ logical delay signals require a whole cycle of delay to realize an apparent advance and this can make stable compensator design more difficult.

The synchronous average harmonic controller implemented by the switched capacitor filter adjusts the phase shift (and resulting transfer current) between the bridges, φ, until an equilibrium condition is met within the maximum current limit. The voltage equilibrium is given by finding the point where the current ripple signal, as defined as the difference in average current over each synchronous half period, is minimized (or reduced to an appropriately low threshold) by the phase feedback:

$$\varepsilon = 0 = -((V_1 \cdot \vec{g}_{AB,\omega} - V_2 \cdot \vec{g}_{CD,\omega}) \odot \vec{Z}_\omega^{-1} - V_2 \cdot \vec{g}_{CD,\omega} \odot \vec{Z}_{L_m,\omega}^{-1}) \cdot \vec{g}_{SQ,\omega}^* \quad \text{EQ6A}$$

$$0 = -V_1 \cdot (\vec{g}_{AB,\omega} \odot \vec{Z}_\omega^{-1}) \cdot \vec{g}_{SQ,\omega} + V_2 \cdot (\vec{g}_{CD,\omega} \odot (\vec{Z}_\omega^{-1} + \vec{Z}_{L_m,\omega}^{-1})) \cdot \vec{g}_{SQ,\omega}^* \quad \text{EQ6B}$$

$$V_2 \cdot (\vec{g}_{CD,\omega} \odot (\vec{Z}_\omega^{-1} + \vec{Z}_{L_m,\omega}^{-1})) \cdot \vec{g}_{SQ,\omega} = V_1 \cdot (\vec{g}_{AB,\omega} \odot \vec{Z}_\omega^{-1} \cdot \vec{g}_{SQ,\omega} \quad \text{EQ6C}$$

where EQ6A is the equilibrium condition, ε=0 (or ε≈0), established by multiplying the current in the non-resonant bridge, $\vec{I}_{CD} = -((V_1 \cdot \vec{g}_{AB,\omega} - V_2 \cdot \vec{g}_{AB,\omega}) \odot \vec{Z}_\omega^{-1} - V_2 \cdot \vec{g}_{CD,\omega} \odot \vec{Z}_{L_m,\omega}^{-1})$, by the Fourier series of the square wave, $\vec{g}_{SQ,\omega}^*$. The current, $\vec{I}_{CD}$, includes flow across the resonant impedance, $(V_1 \cdot \vec{g}_{AB,\omega} - V_2 \cdot \vec{g}_{CD,\omega}) \odot \vec{Z}_\omega^{-1}$, and flow across the impedance of the magnetizing inductance, $V_2 \cdot \vec{g}_{CD,\omega} \odot \vec{Z}_{L_m,\omega}^{-1}$. EQ6B expands the terms of EQ6A and minimizes them in accordance with the synchronous harmonic controller. The square wave, $\vec{g}_{SW,\omega}$, represents the difference in current averaged over each half cycle by the switched capacitor averaging. The filter is selective to reduce harmonic content which is in phase with the square wave. Productive power transfer is out of phase with the square wave and is not observed by the switched capacitor filter because it averages to zero over each synchronous half-period.

EQ6C is dominated by the first harmonic because the switched capacitor averaging filter emphasizes the switching frequency. This allows for simplification of EQ6C as:

$$\frac{V_2}{V_1} = \quad\quad\quad\quad\quad\quad\quad\quad\quad\quad\quad\quad\quad \text{EQ 7A}$$

$$\frac{\left(\left(\vec{g}_{AB,\omega}\odot\vec{Z}_{\omega}^{-1}\right)\cdot\vec{g}_{SQ,\omega}^*\right)}{\left(\left(\vec{g}_{CD,\omega}\odot\left(\vec{Z}_{\omega}^{-1}+\vec{Z}_{L_m,\omega}^{-1}\right)\right)\cdot\vec{g}_{SQ,\omega}^*\right)} = \frac{\left(\left(\vec{g}_{AB,\omega 1}\cdot\vec{Z}_{\omega 1}^{-1}\right)\right)}{\left(\left(\vec{g}_{CD,\omega 1}\cdot\left(\vec{Z}_{\omega 1}^{-1}+\vec{Z}_{L_m,\omega 1}^{-1}\right)\right)\right)}$$

$$\frac{V_2}{V_1} = \frac{|g_{AB,\omega 1}|}{|g_{CD,\omega 1}|} = \frac{\sin(\pi\cdot d_1)}{\sin(\pi\cdot d_2)} \quad\quad \text{EQ 7B}$$

where the converter input output relationship (EQ7B) is controlled by the ratio of duty cycles when the impedance due to magnetizing inductance, $\vec{Z}_{L_m,\omega 1}$, is large compared to the series impedance, $\vec{Z}_{\omega 1}$.

The non-resonant bridge current sensor used to approximate $\vec{I}_{CD}$ is preferred in the first embodiment (FIG. 3) because it has good measurement bandwidth. With $d_2<50\%$, there may be some overlap between the sensed current for both switches which still produces a meaningful residual signal to feed back on. Another option to sense current is to locate the current sensor in the switching reference frame, but this presents challenges with respect to common mode rejection, bandwidth, and parts complexity. Related modulation schemes can be used which result in improved sensing of the current by using complementary inputs (such as with a blocking capacitor and $g_D=\overline{g_C}$). Another option, if a capacitive half-bridge is used, is to place the sensed resistive shunt in series with a capacitor to the ground reference.

Another approach to control synchronous average ripple current is to use an analog phase locked loop comprised of an analog multiplying phase detector, an integrating error amplifier, and a voltage-controlled oscillator. The alternate approach only operates at resonance (by definition) where the series resonant impedance cannot passively limit transfer current, and does not accept a clock which can be important for synchronizing multiple converter phases. Prior methods which use phase locked loops employing current zero-crossing based phase detectors only minimize the current at zero crossings and do not minimize the synchronous average harmonic current resulting in different behavior. They can also have difficulty with bi-directional current transfer because the direction of zero crossing changes with load current reversal.

Examples of the presently invented converter's voltage gain given in EQ7B are illustrated in FIG. 9. The horizontal axis shows the duty cycle and the vertical axis shows the gain. FIG. 9A shows buck gain (voltage attenuation) versus duty cycle. For this gain, $d_1=d$ and $d_2$ is fixed at 0.5. FIG. 9B shows boost gain (voltage amplification) versus duty cycle. For this gain, $d_1=0.5$ and $d_2=0.5-d$. FIG. 9C shows buck-boost gain (voltage attenuation and amplification) versus duty cycle. For this mode, $d_1=d$ and $d_2=0.5-d$. Other independent arbitrary duty cycles inputs between 0 and 1 are allowed for $d_1$ and $d_2$. The presently invented power converter realizes the gain relationship (EQ7B) because the synchronous average harmonic controller results in the equilibrium condition in EQ6. The predictable gain relationship allows for deterministic operation without isolated voltage sensing and results in load invariance (when not intentionally current limited).

FIG. 10 shows the approximate ratio of the RMS transformer current and DC current for the presently invented power converter operating with buck gain using a fixed load current. The RMS current is related to power dissipation from conduction losses, while the DC current is related to the power used by the load. The buck converter has $d_1=d$ and $d_2=0.5$. Two lines are overlaid on the plot indicating the resonant bridge current and non-resonant bridge current respectively. The first line (1001) is $$\left(\frac{\pi}{\sqrt{8}}\cdot\frac{1}{\sin(\pi d)}\right).$$

This quantity is the relationship between RMS and average current for an idealized harmonic converter based on power preservation. The second reference line (1002) is $$\left(\frac{\pi}{\sqrt{8}}\right).$$

This is the relationship between RMS and average current assuming a rectified sine wave.

FIG. 11 show the ratio of the instantaneous transformer current ($\vec{I}_{CD}$) to the DC current ($I_2$) for the non-resonant bridge (302) for several duty cycles ($d_1=\{0.125, 0.25, 0.50\}$ and $d_2=0.5$). FIG. 11A shows current (1103) for ($d_1=0.125$, $d_2=0.5$) and the differential gate signals gAB (1101) and gCD (1102). FIG. 11B shows current (1113) for ($d_1=0.25$, $d_2=0.5$) and the differential gate signals gAB (1111) and gCD (1112). FIG. 11C shows current (1123) for ($d_1=0.5$, $d_2=0.5$) and the differential gate signals gAB (1121) and gCD (1122). The presently invented converter's synchronous average harmonic controller causes the average current over the period to be approximately zero and the difference in average current over each half period to be approximately zero. This can result in lower RMS current than switching using zero crossings.

The presently invented converter has a small ripple current which can be used to ensure soft switching. The converter is configured for soft switching over a range of loads and duty cycles by setting the magnetizing inductance, $L_m$. The non-resonant bridge creates a rectangular voltage source across the magnetizing inductance which lowpass filters the rectangular voltage to result in a triangular bias current. The bias current results in a negative IDs (current from drain to source for a MOSFET) at switch turn on and positive IDs at switch turn off. This results in soft switching by minimizing the voltage potential at turn on and disabling the body diode at turn off. The bias current can be set to best minimize conduction and switching losses over a wide range of load currents.

The synchronous average harmonic controller in the presently invented power converter allows for bi-directional current transfer. This results from allowing for positive or negative phase shifts between the respective bridges which gives the present converter flexibility to be attached to loads which generate and store power such as inductive motor windings or capacitive filters. The presently invented converter can have the source or load on either the resonant or non-resonant side. FIG. 12 shows an embodiment of the presently invented converter with the source and the load transposed. For both FIG. 12A and FIG. 12B, the source is shown on the left as V1 and the load is shown on the right as an impedance (CL) and current (IL) drawing from V2. In FIG. 12A, the resonant bridge (1201A), resonant network (1205A) and resonant bridge PWM controller (1206A) is on the left side with the source. The non-resonant bridge (1202A), synchronous harmonic controller (1208A) and non-resonant bridge controller (1209A) is on the right side with the load. FIG. 12B has the converter functional blocks reversed. In FIG. 12B, the resonant bridge (1201B), resonant network (1205B) and resonant bridge PWM controller (1206B) is on the right side with the load. The non-resonant bridge (1202B), synchronous harmonic controller (1208B) and non-resonant bridge controller (1209B) is on the left side with the source. Other configurations are made possible by projecting elements of the resonant network (1205) across the transformer resulting in an equivalent resonant impedance, but these are not explored here because they may result in additional parts (for example extra DC blocking capacitors).

The presently invented converter is configured for multiple independently controlled resonant bridges as shown in the embodiment given in FIG. 13. This embodiment has one input (V1) and two outputs (V2 and V3). The input has a resonant bridge (1301A), resonant network (1305A) and primary bridge PWM controller (1306A). The first output has a non-resonant bridge (1302), synchronous harmonic controller (1308) and a non-resonant bridge PWM controller (1309). The second output uses its own resonant bridge (1301B), resonant network (1305B), and resonant bridge PWM controller (1306B). The isolation transformer (1310) and the synchronous average harmonic controller (1308) couple each input and output resulting in:

$$\frac{V_2}{V_1} = \frac{\sin(\pi \cdot d_1)}{\sin(\pi \cdot d_2)} \qquad \text{EQ 8A}$$

$$\frac{V_3}{V_1} = \frac{\sin(\pi \cdot d_1)}{\sin(\pi \cdot d_3)} \qquad \text{EQ 8B}$$

where $d_1$ is the duty cycle for the resonant bridge input, $d_2$ is the duty cycle for the non-resonant bridge output, and $d_3$ is the duty cycle for the resonant bridge output. Each voltage is controlled by duty cycles using the same relationship as given earlier in EQ7B. Sufficient degrees of freedom are available to independently regulate each output. This regulation does not require any additional series power parts after the bridge and bulk capacitance is shared for the purposes of energy storage because the power converter allows bidirectional power transfer. This application enables independently regulated auxiliary supplies using one transformer and allows for multiple isolated regulated power loads. The resonant bridge output may be configured to use its own synchronous average harmonic current controller to minimize ripple current if its resonant frequency differs significantly from the input resonant bridge.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A power converter comprising:
  a first bridge circuit comprising a first plurality of switching devices coupled to a first transformer winding of a transformer device;
  at least one first controllers coupled to the first plurality of switching devices and configured to generate first control signals for the first plurality of switching devices;
  a second bridge circuit comprising a second plurality of switching devices coupled to a second transformer winding of the transformer device;
  a resonant network coupled to the first transformer winding, or the second transformer winding, or both the first transformer winding and the second transformer winding; and
  at least one second controllers coupled to the second plurality of switching devices and configured to generate second control signals for the second plurality of switching devices, the at least one second controllers comprising:
    a synchronous average harmonic current compensator configured to average and compensate a measured current signal synchronously over each half of a switching period and sample compensator output;
    a differential duty cycle feedback loop configured to control on an average current over the switching period, wherein a differential duty cycle command increases a duty cycle in one half of the second bridge or decreases a duty cycle in an other half of the second bridge or modifies a differential duty cycle across the second bridge;
    a phase feedback loop configured to control a difference in average current over each half switching period by adjusting a phase command, wherein the phase command causes net current flow coupling harmonic voltages of the first bridge circuit and the second bridge circuit; and
    a synchronous pulse width modulation process wherein a reference duty cycle is modulated to generate a phase shifted pulse width modulation waveform with prescribed average reference duty cycle.

2. The power converter of claim 1, wherein the synchronous average harmonic current compensator further comprises:
  a switched capacitor filter circuit configured to average and compensate the measured current signal synchronously over each half of the switching period and alternately sample each half switching period average to generate the differential duty cycle command and the phase command; and
  a clamp operatively configured to limit a total relative phase to limit current.

3. The power converter of claim 2, wherein the switched capacitor filter circuit comprises a first switched capacitor coupled to a first switched capacitor switching device, and a second switched capacitor coupled to a second switched capacitor switching device.

4. The power converter of claim 3, wherein the switched capacitor filter circuit further includes at least one capacitor resistor network parallel to the first switched capacitor, the second switched capacitor, or both the first switched capacitor and the second switched capacitor.

5. The power converter of claim 1, wherein the at least one second controllers further comprises a current sense preamplifier operatively coupled to a current sensor.

6. The power converter of claim 5, wherein the current sensor is in-line with the second transformer winding.

7. The power converter of claim 1, wherein the first plurality of switching devices comprises a full bridge circuit comprising at least two pairs of switching devices.

8. The power converter of claim 1, wherein the first plurality of switching devices comprises at least two switching devices coupled to at least one capacitor to form a capacitive half-bridge.

9. The power converter of claim 1, wherein the second plurality of switching devices comprises a full bridge circuit comprising at least two pairs of switching devices.

10. The power converter of claim 1, wherein the second plurality of switching devices comprises at least two switching devices coupled to at least one capacitor to form a capacitive half-bridge.

11. The power converter of claim 1, wherein the transformer device comprises the first transformer winding and the second transformer winding, and further comprising a determined turn ratio relative to the first bridge circuit.

12. The power converter of claim 1, wherein the at least one first controller further comprises a plurality of modulators coupled to the first plurality of switching devices and configured to generate the first control signals wherein a difference voltage comprises an AC pulse width modulated waveform synchronous with the switching period.

13. The power converter of claim 1, wherein the first bridge circuit comprises a resonant bridge circuit and the second bridge circuit comprises a non-resonant bridge circuit.

14. The power converter of claim 1, further comprising one or more independently regulated auxiliary supplies.

15. The power converter of claim 1 wherein the resonant network is further comprised of an inductance and a capacitive impedance device.

16. The power converter of claim 1 wherein the first and second controller circuit are incorporated into an integrated circuit.

17. The power converter of claim 1, wherein the synchronous average harmonic current compensator is further comprised of an analog multiplying phase detector, an integrating error amplifier and a voltage controlled oscillator.

18. The power converter of claim 1 wherein the at least one first controllers is further comprised of a differential pulse width modulation process which generates a difference between square waves with opposing phase shifts.

19. A method comprising:
sensing a current in a second bridge circuit of a bi-directional power converter comprising a first bridge circuit and the second bridge circuit, wherein the sensed current is sensed in at least one of a second side coil of a transformer device of the bi-directional power converter or in a switching reference frame;
generating first control signals for the first bridge circuit;
driving a filter circuit by an amplifier that receives the sensed current;
averaging and compensating the sensed current synchronously over each half of a switching period and alternately sampling each half switching period signal;
controlling average current over the switching period by increasing a relative duty cycle in one half of the second bridge circuit or by decreasing a relative duty cycle for an other half of the second bridge circuit, or modifying a differential duty cycle across the second bridge circuit;
controlling a difference in average current over each half switching period by adjusting a phase command, wherein the phase command causes net current flow that couples harmonic voltages of the first bridge circuit and the second bridge circuit; and
generating a phase shifted pulse width modulation waveform with prescribed average reference duty cycle.

20. The method of claim 19, further comprising limiting a total relative phase.

* * * * *